W. H. FOOT.
OILING RING FOR SHAFT BEARINGS.
APPLICATION FILED AUG. 11, 1917.

1,409,693.

Patented Mar. 14, 1922.

oil level

WITNESSES:

INVENTOR
William H Foot.
BY
ATTORNEY

UNITED STATES PATENT OFFICE.

WILLIAM H. FOOT, OF EDGEWOOD PARK, PENNSYLVANIA, ASSIGNOR TO WESTINGHOUSE ELECTRIC & MANUFACTURING COMPANY, A CORPORATION OF PENNSYLVANIA.

OILING RING FOR SHAFT BEARINGS.

1,409,693.	Specification of Letters Patent.	Patented Mar. 14, 1922.

Application filed August 11, 1917. Serial No. 185,708.

*To all whom it may concern:*

Be it known that I, WILLIAM H. FOOT, a subject of the King of Great Britain, and a resident of Edgewood Park, in the county of Allegheny and State of Pennsylvania, have invented a new and useful Improvement in Oiling Rings for Shaft Bearings, of which the following is a specification.

My invention relates to oiling rings for shaft bearings, and it has for its object to provide a simple and inexpensive means which shall prevent impairment or interruption of the operation of such oiling rings.

Figure 1:
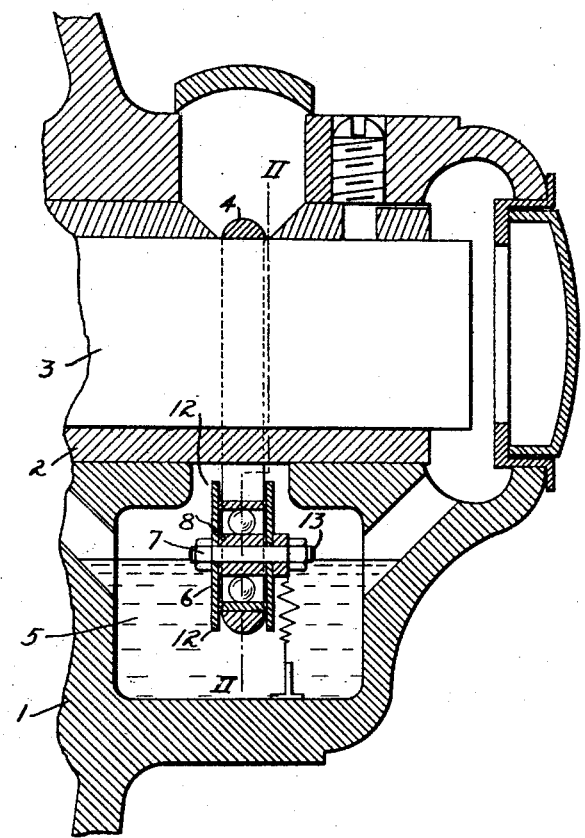
Figure 2:
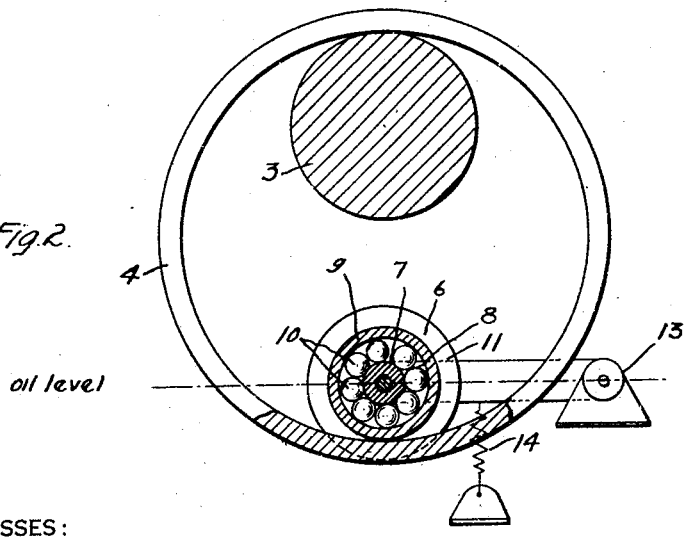

Referring to the drawing, Fig. 1 is a sectional view of a bearing constructed in accordance with my invention. Fig. 2 is a sectional view of a portion of the apparatus shown in Fig. 1, the section being taken along the line II—II of Fig. 1.

Heretofore, it has been customary in constructing an oiling ring lubricated bearing, to allow the oiling ring to move freely along the shaft within the chamber provided for it. The disadvantages of this method of oiling are that, when the shaft is inclined from the horizontal, as, for instance, in a motor mounted in a submarine vessel which is either diving or rising to the surface, the oiling ring will move to the lower side of its chamber. When the angle of inclination of the shaft to the horizontal becomes great enough, the ring falls away from the shaft and lies on the bearing, surrounding, but not in engagement with, the shaft, and the application of oil to the shaft thereupon ceases.

By my invention, I provide a device whereby the oiling ring will be prevented from movement longitudinally with respect to the shaft and will continue to operate, even though the shaft assumes a vertical position.

Referring to Fig. 1 of the accompanying drawing, a motor casing 1 is provided with a bearing member 2 in which a shaft 3 is mounted. The shaft 3 is provided with an oiling ring 4 which rides on the shaft within an oil chamber 5 in the motor casing 1. The oiling ring 4 is provided with a roller member 6 which is adapted to prevent movement thereof longitudinally of the shaft. The roller member 6 comprises a shaft 7, a sleeve 8, a ring 9 and a set of bearing balls 10, interposed between said sleeve and said ring. The end disks 11 of the ball cage are of such diameter as to provide flanges 12 for preventing disengagement of the ring 4 from the roller member 6. The roller member 6 rests upon the inner surface of the ring 4 and is pivotally mounted on a vertically movable arm 13 which holds the ring 4 in its operative position and is restrained by a spring 14.

While I have described my invention in connection with an oiling ring, it will be obvious to those skilled in the art that similar advantages may be derived therefrom by the use of any suitable oil-carrier such, for example, as a spring or strap.

While I have herein described in detail one form of my invention and one application of the same, I do not wish to be understood as limiting myself to the form or the application of said invention except as limitations may be imposed by the prior art or be specifically set forth in the appended claims.

I claim as my invention:

1. An oil-lubricated bearing comprising a shaft, an oiling ring, an oil chamber and means for maintaining the oiling ring in yieldable engagement with said shaft in a plane substantially perpendicular to the shaft axis.

2. An oil-lubricated bearing comprising a shaft, an oiling ring, an oil chamber and means for yieldably ensuring an invariable angular relation between the oiling ring and the shaft.

3. An oil-lubricated bearing comprising a shaft, an oiling ring, an oil chamber and means for resiliently maintaining a substantially parallel relation between the axis of the oiling ring and that of the shaft.

4. An oil-lubricated bearing comprising a shaft, an oiling ring, an oil chamber and means for yieldably maintaining the oiling ring in contact with said shaft and substantially in the center of the oil chamber.

5. An oil-lubricated bearing comprising a shaft, an oiling ring, an oil chamber and a resiliently mounted member making engagement with the inner surface of the oiling ring to retain said ring in an invariable relation to said shaft.

6. An oil-lubricated bearing comprising a shaft, an oiling ring, an oil chamber and a roller member in resilient engagement with the inner surface of said ring to retain it in a certain definite relation to said shaft.

7. An oil-lubricated bearing comprising a shaft, an oil carrier, an oil chamber, a roller member in engagement with the inner surface of said oil-carrier and a pivotally supported arm upon the free end of which said roller member is mounted.

8. An oil-lubricated bearing comprising a shaft, an oil-carrier, an oil chamber, a flanged roller member in engagement with the inner surface of said oil carrier and a pivotally supported arm upon the free end of which said roller member is mounted.

9. An oil-lubricated bearing comprising a shaft, an oil-carrier, an oil chamber, a flanged roller member in engagement with the inner surface of said oil-carrier, a pivotally supported arm upon the free end of which said roller member is mounted and a restraining spring for said arm.

10. An oil-lubricated bearing comprising a shaft, an oil-carrier, an oil chamber, a flanged ball-bearing roller member in engagement with the inner surface of said oil-carrier, a pivotally supported arm upon the free end of which said roller member is mounted and a resilient means for holding said roller member in engagement with said oil-carrier.

In testimony whereof, I have hereunto subscribed my name this 19th day of July, 1917.

WILLIAM H. FOOT.